US009847991B2

(12) United States Patent
Guionneau

(10) Patent No.: US 9,847,991 B2
(45) Date of Patent: Dec. 19, 2017

(54) METHOD FOR MANAGING USER ACCOUNTS IN A HOSTED APPLICATION

(71) Applicant: EVIDIAN, Les Clayes-sous-Bois (FR)

(72) Inventor: Christophe Guionneau, Grenoble (FR)

(73) Assignee: EVIDIAN, Les Clayes-sous-Bois (FR)

( * ) Notice: Subject to any disclaimer, the term of this patent is extended or adjusted under 35 U.S.C. 154(b) by 0 days.

(21) Appl. No.: 15/311,009

(22) PCT Filed: May 13, 2015

(86) PCT No.: PCT/FR2015/051265
§ 371 (c)(1),
(2) Date: Nov. 14, 2016

(87) PCT Pub. No.: WO2015/173517
PCT Pub. Date: Nov. 19, 2015

(65) Prior Publication Data
US 2017/0078272 A1    Mar. 16, 2017

(30) Foreign Application Priority Data
May 14, 2014 (FR) ...................... 14 54303

(51) Int. Cl.
H04L 29/06    (2006.01)
G06F 21/41    (2013.01)
(52) U.S. Cl.
CPC .......... *H04L 63/0815* (2013.01); *G06F 21/41* (2013.01); *H04L 63/10* (2013.01)
(58) Field of Classification Search
CPC .... H04L 63/08; H04L 63/0815; H04L 63/102
See application file for complete search history.

(56) References Cited

U.S. PATENT DOCUMENTS

| | | | | |
|---|---|---|---|---|
| 6,144,959 A | * | 11/2000 | Anderson | ............... G06F 21/31 |
| 2004/0015596 A1 | * | 1/2004 | Sapuram | ............... G06Q 10/10 |
| | | | | 709/230 |
| 2015/0154913 A1 | * | 6/2015 | Kim | ..................... G09G 3/3233 |
| | | | | 345/691 |

OTHER PUBLICATIONS

International Search Report as issued in International Patent Application No. PCT/FR2015/051265, dated Sep. 7, 2015.

(Continued)

*Primary Examiner* — Jason K Gee
(74) *Attorney, Agent, or Firm* — Pillsbury Winthrop Shaw Pittman LLP

(57) ABSTRACT

A method for managing user accounts in an application of an application provider, includes: receiving a request for proof of authentication to authenticate a user attempting to access the application, the user being registered with an identity provider having a trust relationship with the application provider; obtaining, from a local database, user data including authentication data and access rights data; authenticating the user by the authentication data; determining the user right to access the application, by the access rights data; determining the existence or absence of a user account associated with the user, by querying an external database managed by the application provider; if the user has the right to access the application and there is no user account associated with the user: triggering provisioning of the user account at an entity, generating a proof of authentication associated with the user, sending the proof of authentication to the application provider.

9 Claims, 3 Drawing Sheets

(56) References Cited

OTHER PUBLICATIONS

Saralaya, G., et al., "Design and implement just-in-time provisioning with SAML 2.0," Retrieved from the Internet: URL: <http://www.ibm.com/developerworks/library/se-jitp-pdf.pdf> [retrieved on Jan. 8, 2015], Aug. 2012, XP055160627, 16 pages.
Wahl, M., "SCIM Profile for Enhancing Just-In-Time Provisioning draft-wahl-scim-jit-profile-02.txt," Network Working Group, Internet Draft, May 2014, XP015099038, pp. 1-16.
Carru, D., JIT User Provisioning in OIF/SP, Retrieved from the Internet: URL: http://blogs.oracle.com/dcarru/entry/jit_user_provisioning_in_oif> [retrieved on Jan. 9, 2015], Apr. 2014, XP002734297, pp. 1-22.
Ragouzis, N., et al. (editors), "Security Assertion Markup Language (SAML) V2.0 Technical Overview," OASIS Security Services TC, Retrieved from the Internet: URL: http://docs.oasis-open.org/security/saml/Post2.0/sstc-saml-tech-overview.2.0-cd-02.pdf> [retrieved on Apr. 14, 2010], XP002578461, 51 pages.
International Preliminary Report on Patentability and the Written Opinion of the International Searching Authority as issued in International Patent Application No, PCT/FR2015/051265, dated Nov. 15, 2016.

* cited by examiner

METHOD FOR MANAGING USER ACCOUNTS IN A HOSTED APPLICATION

CROSS REFERENCE TO RELATED APPLICATIONS

This application is the U.S. National Stage of PCT/FR2015/051265, filed May 13, 2015, which in turn claims priority to French Patent Application No. 1454303 filed May 14, 2014, the entire contents of all applications are incorporated herein by reference in their entireties.

TECHNICAL FIELD OF THE INVENTION

The present invention relates to the field of application service providers such as "Cloud" applications or software as a service (SaaS), that is hosted applications.

TECHNOLOGICAL BACKGROUND OF THE INVENTION

By application service provider, it is meant a supplier capable of providing users with a hosted application usable through a network. Since these hosted applications are often usage-based billed and/or available for a limited period of time, the application service providers require authentication of users attempting to access the application.

On the other hand, the application service providers generally enable the authentication to be delegated to entities called identity providers with which the users are registered through mechanisms of authentication delegation and identity federation. This delegation requires a trust link set beforehand between the application service provider and the identity provider.

Groups of users, for example enterprises, thus have the possibilities to install an identity provider to perform authentication of users. It is then the responsibility of the identity provider to optimise the creation (called provisioning in the following) and destruction (called deprovisioning in the following) of user accounts based on the real use, in particular to reduce the number of licenses to be bought at the application service provider.

Most known solutions consist in using a manager for rights and roles of the users to perform provisioning or deprovisioning of a user account at the time when a user acquires or loses the rights for accessing the application. If this solution actually allows the deprovisioning to be made at the time when the right loss information is known, it does not enable the provisioning to be optimised as close to the real use as possible: indeed, the user can acquire the right a long time before its usage, or even never use its right to access the application. At a given instant, thereby there is always more provisioned users (that is users associated with a user account) than users who really use the application.

Solutions of provisioning on the fly exist, but they have to be installed at the application service provider. These solutions rely on user attributes conveyed by protocols enabling authentication proofs to be communicating between the identity provider and the application service provider. The most used protocols are SAML ("Security assertion markup language"), OAuth or even OpenID protocols. These solutions thereby depend on the good will of the application service providers at implementing them. Furthermore, they are restricted to provisioning and do not take deprovisioning into account.

GENERAL DESCRIPTION OF THE INVENTION

The object of the invention offers a solution to the previously discussed problem, by providing a method for managing user accounts in a hosted application, enabling provisioning of user accounts to be optimised.

According to a first aspect, the invention thus relates to a method for managing user accounts in an application of an application service provider, comprising the following steps, performed by an identity provider sharing a trust relationship with the application service provider:

receiving a request for proof of authentication in order to authenticate a user attempting to access the application, said user being registered with the identity provider;

obtaining, from a local database, data about the user, said data comprising: authentication data and access rights data;

authenticating the user by means of the authentication data;

determining the right to access the application by the user, by means of the access rights data;

determining the existence or absence of a user account associated with the user, by querying an external database managed by the application service provider;

if the user has the right to access the application and there is no user account associated with the user:
triggering the provisioning of the user account at an entity;
generating a proof of authentication associated with the user;
sending said proof of authentication to the application service provider.

By virtue of the method according to the invention, the user accounts are provisioned at the time when the users who have the right to access the application actually desire to access the application. The user accounts are thus not systematically created as soon as a user obtains a right to access the application. Furthermore, this method is implemented by the identity provider, thus there is no need for intervening at the application service provider.

The method according to the invention can exhibit one or more complementary characteristics from the following ones, considered alone or according to any technically possible combinations.

In one embodiment, the method includes the following step: if the user does not have the right to access the application and there is a user account associated with the user, triggering the deprovisioning of the user account at the entity. Thus, if the user has lost his right to access the application, his/her account is deleted when he/she desires to access it.

In one embodiment, the entity is the application service provider, the identity provider providing account provisioning or deprovisioning instructions to the external database. In this embodiment, the identity provider performs itself provisioning or deprovisioning by using interfaces and protocols provided by the application service provider and by providing all the information required for creating the account. It is noted that the necessary actions, protocols and formats to implement depend on each application service provider. Hosted application service providers provide a set of interfaces and guides to perform these actions, use normalised or proprietary protocols, and some of them provide online orders or executable files to perform these actions.

In one embodiment, the entity is an external management component, the external management component providing account provisioning or deprovisioning instructions to the external database. In this embodiment, the identity provider does not perform itself provisioning or deprovisioning, but delegates it to the external component, for example a component for identities and accesses, which triggers workflows of provisioning or deprovisioning. The external component uses interfaces and protocols provided by the application service provider and provides all the information required for creating the account.

In one embodiment, after a provisioning or deprovisioning triggering of a user account, the identity provider updates information of user accounts, indicating the user accounts associated with the application service provider and the user accounts associated with the user.

In one embodiment, the identity provider performs an overall checking step, comprising:
   for each user registered with the identity provider, obtaining form the local database access rights data relating to the user;
   determining a list of user accounts to be deprovisioned, based on the access rights and the information of user accounts;
   triggering the deprovisioning of the user accounts from the list of accounts to be deprovisioned.

The overall checking makes it possible to ensure that the provisioned accounts are actually associated with users who still have rights or roles necessary to have an account, and possibly the accounts which do not meet this condition are deprovisioned. The deprovisioning is thereby made either directly by the identity provider, or by the external management component.

In one embodiment, the identity provider performs a reconciliation step, comprising:
   obtaining from the external database a list of user accounts provisioned;
   comparing the information of user accounts with the list of accounts to be provisioned;
   updating the information of user accounts based on the result of the comparison.

The reconciliation enables desynchronizations to be detected and alerts to be generated or incoherencies to be corrected.

In one embodiment, the identity provider performs an account deletion step, comprising:
   obtaining a piece of information for modifying access rights data of a user;
   determining a list of accounts to be deprovisioned, based on the access rights data modified and the information of user accounts;
   triggering the deprovisioning of the accounts from the list of accounts to be deprovisioned.

Thus, when the identity provider is informed that a user loses his/her rights or roles required for having an account, a deprovisioning is triggered. The deprovisioning is then performed either directly by the identity provider, or by the external management component.

According to a second aspect, the invention relates to an identity provider sharing a trust relationship with an application service provider, adapted to implement a method according to the first aspect of the invention.

According to a third aspect, the invention relates to a computer program, comprising a set of instructions, which when run by a computer, causes the implementation of a method according to the first aspect of the invention.

The invention and its different applications will be better understood upon reading the description that follows and upon examining the accompanying figures.

BRIEF DESCRIPTION OF FIGURES

The figures are only presented by way of indicating and in no way limiting purposes of the invention. The figures show.

DETAILED DESCRIPTION OF AT LEAST ONE EMBODIMENT OF THE INVENTION

Unless otherwise indicated, a same element appearing on different figures has a single reference.

Figure 1:
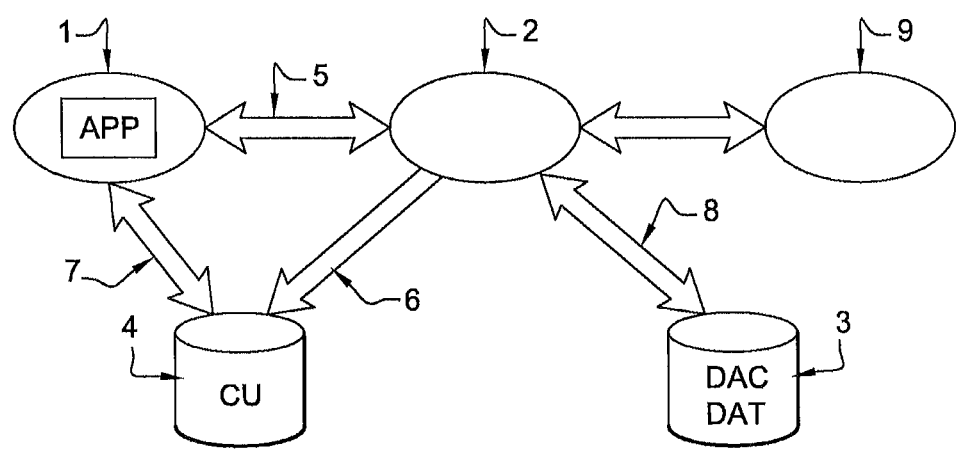
in FIG. 1, a schematic representation of a network comprising an application service provider and an identity provider according to a non-limiting embodiment of the invention.

The present invention relates to a method for provisioning (creating) user accounts CU in an application APP of an application service provider 1. With reference to FIG. 1, the application APP is hosted in the application service provider 1 and accessible via a network to users USR. The users USR considered in the embodiment described belong to a structured group of people, for example an enterprise having employees, the employees (users) having or not the right to access the application APP based on a policy of rights and roles defined within the enterprise. In order to access the application APP, the users USR thus have to be authenticated, which makes it possible to check that they actually have the right to access the application APP.

The enterprise has an identity provider 2 to which the application service provider 1 delegates the authentication function of the users USR of the enterprise. For this, the application service provider 1 and the identity provider 2 have set beforehand a trust relationship by using a protocol 5 such as the SAML, OAuth, OpenID protocols or other protocols of identity federation or authentication delegation. The identity provider 2 and the application service provider 1 know each other, and the application service provider 1, by using the protocol 5, is capable of requesting or obtaining from the identity provider 2 a proof of authentication PAT for the users USR of the enterprise.

Indeed, the users USR have means necessary to perform an authentication towards the identity provider 2, for example via a password, certificate, question-answer mechanism system, etc. The identity provider 2 has itself a local database 3 (for example a relational database or a LDAP directory) in which the users USR of the enterprise are registered. The set of the users USR belonging to the enterprise is listed in the local database 3. The identity provider 2 is capable of being connected to the local database 3 through an access protocol 8 such as the LDAP/LDAPS (Lightweight Directory Access Protocol), Web Service, SQL (Structured Query Language) protocols, etc. This local database 3 is used by the identity provider 2 to check authentications, identify the users USR, and know the rights of the users. The local database 3 thus includes, for each user USR, authentication data DAT and access rights data DAC which may be consulted by the identity provider 2.

On the other hand, to create (provision) a user account CU, the identity provider 2—or an external component 9 that the identity provider controls—provides provisioning information to an external database 4 managed by the application service provider 1. This provisioning information is all the information necessary to the application service provider 1 such that it is capable of creating a user account. Likewise, to destroy (or deprovision) a user account CU, the identity provider 2 or the external component 9 provides deprovisioning information to the external database 4. The deprovisioning information is all the information necessary to the application service provider 1 such that it is capable of determining the user account CU to be deleted. In order for the identity provider 2 or the external component 9 to be able to communicate with the external database 4, the application service provider 1 provides the identity provider 2 with interfaces and protocols 6. The application service provider 1 is itself capable of querying the external database 4 by means of a dedicated protocol 7, for example LDAP/LDAPS (Lightweight Directory Access Protocol), Web Service, SQL (Structured Query Language) protocols, etc.

Figure 2:
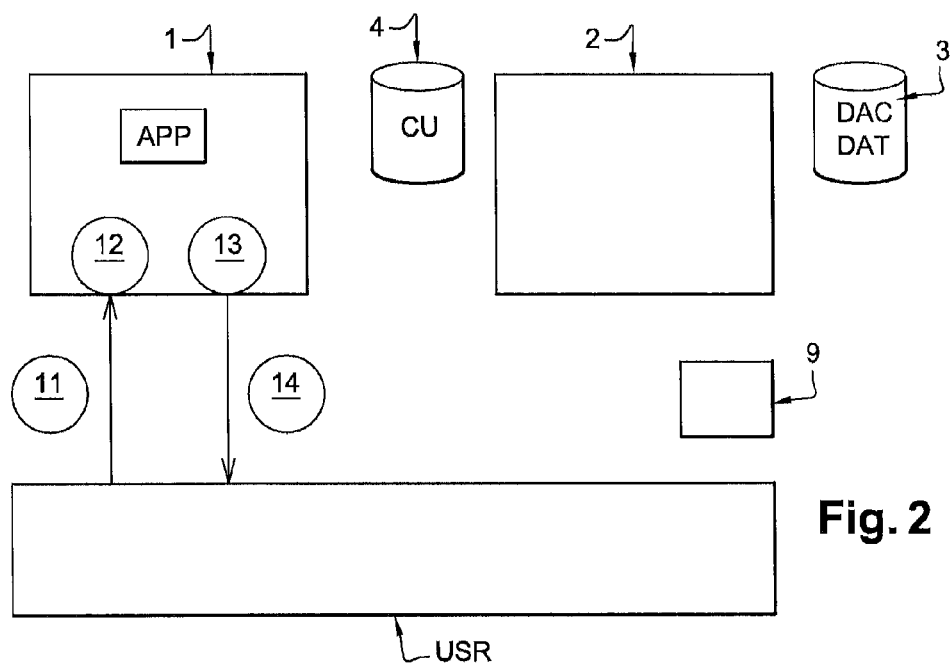
in FIG. 2, a schematic representation of a method according to an embodiment for managing user accounts of an application of the application service provider, implementing the application service provider and the identity provider.
Figure 3:
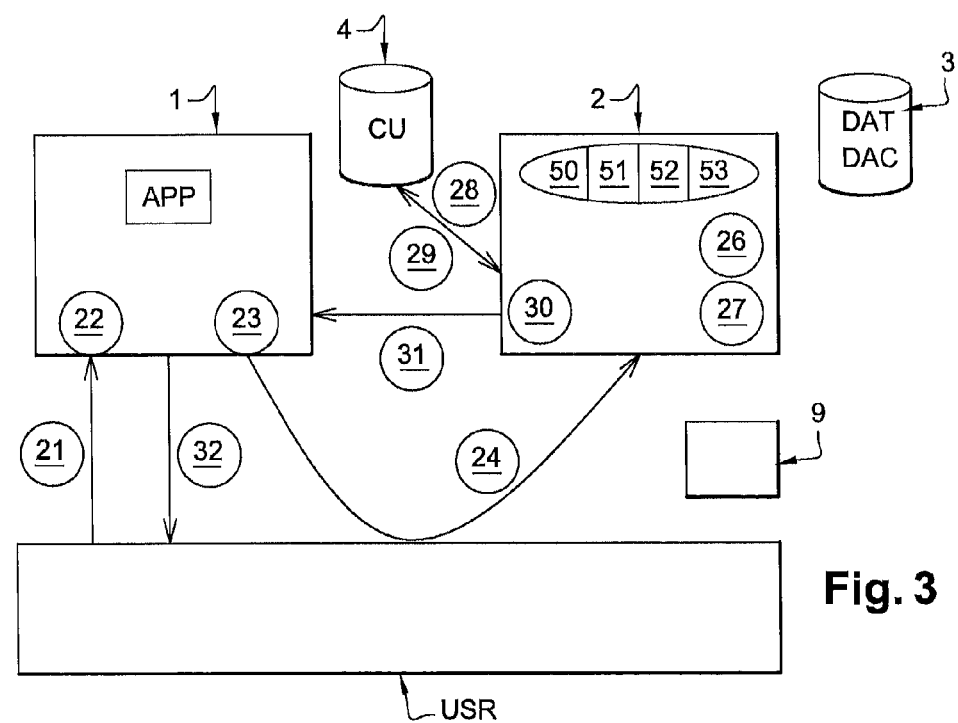
in FIG. 3, a schematic representation of a method according to an embodiment for managing user accounts of an application of the application service provider, and in FIG. 4, a schematic representation of a method according to an embodiment for managing user accounts of an application of the application service provider.
Figure 4:
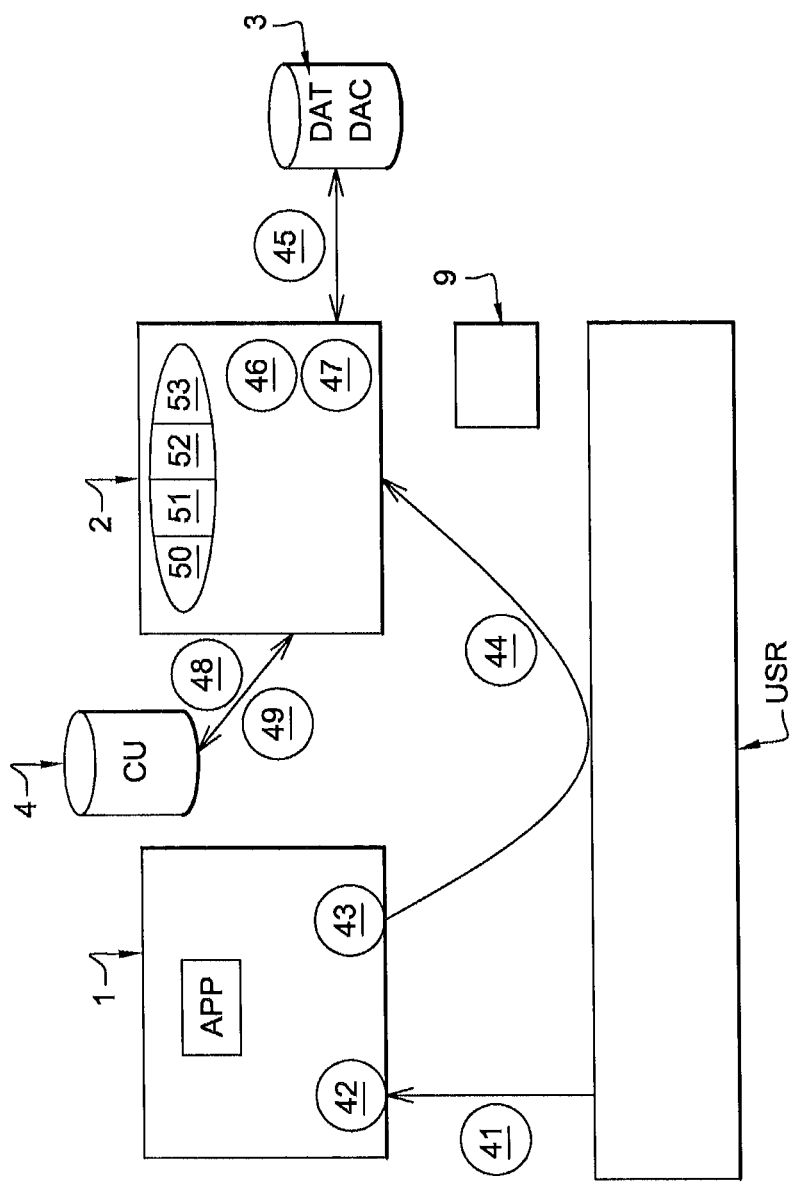

The method according to one embodiment is represented with reference to FIGS. 2, 3 and 4, in different cases. In each of these cases, a user USR desires to access the application APP.

In a first case represented in FIG. 2, the user USR possesses a proof of authentication PAT issued beforehand by the identity provider 2. This case occurs for example when the user USR is already connected to the application APP and still has the right to access the application APP.

According to a first step 11, the service provider 1 receives a request to access the application APP.

According to a second step 12, the service provider 1 determines whether the user USR possesses a proof of authentication PAT.

According to a third step 13, following the determination of the possession of a proof of authentication PAT by the user USR, the service provider 1 checks the proof of authentication PAT. The proof of authentication PAT is checked with the information known by the service provider 1 about the identity provider 2 which issued this proof. Protocol mechanisms of identity federation and authentication delegation, such as SAML, OAuth, OpenID or other protocols, are used to check the proof.

According to a fourth step 14, following the check of the proof of authentication PAT, the application service provider 1 gives the user USR access to the application APP.

In a second case represented in FIG. 3, the user USR does not possess a proof of authentication PAT, has the right to access the application APP, and does not have a user account CU. This case occurs for example when the user USR has never been connected to the application APP although it has a right to access the application APP.

According to a first step 21, the service provider 1 receives a request to access the application APP.

According to a second step 22, the service provider 1 determines whether the user USR possesses a proof of authentication PAT.

According to a third step 23, after it is determined that the user USR does not possess a proof of authentication PAT, the application service provider 1 determines which is the identity provider 2 associated with the user USR. The application service provider 1 uses the protocol mechanisms of federation or authentication delegation to determine the identity provider 2 of the user USR. In another embodiment, the application service provider 1 requests information from the user USR. In another embodiment, the application service provider 1 uses the specific naming of URLs of the service to determine the identity provider 2 associated therewith.

According to a fourth step 24, the service provider 1 redirects the user USR to the identity provider 2. According to the protocols of federation and identity delegation used, in another embodiment, the application service provider 1 directly sends a request to the identity provider 2. In both cases, regardless of whether the request comes from the user USR or the application service provider 1, the identity provider 2 receives a request for a proof of authentication PAT.

According to a fifth step 25, the identity provider 2 obtains from the local database 3 data about the user USR, including his/her authentication data DAT and his/her access rights data DAC.

According to a sixth step 26, the identity provider 2 authenticates the user USR by means of the authentication data DAT. For this, the identity provider 2 checks that the user USR is actually a declared user and that he/she has authentication means. Then, the authentication is performed, for example by means of a password, a certificate, a question-answer mechanism, etc.

According to a seventh step 27, if the user USR is properly authenticated, the application service provider 2 determines whether he/she possesses the right to access the application APP, by means of the access rights data DAC. The identity provider 2 thus checks that the user USR actually has the rights and roles necessary to be connected and use the application APP. It is noted that if the user USR fails to be properly authenticated, the process stops.

According to an eighth step 28, the identity provider 2 determines the existence or absence of a user account CU associated with the user USR, by querying the external database 4 managed by the application service provider 1. The identity provider 2 thus determines whether the user USR is already associated with a user account CU in the application service provider 1, said user account CU having been provisioned beforehand by the identity provider 2 or by other means. For this, the identity provider 2 uses the interfaces and protocols 6 available from the application service provider 1.

According to a ninth step 29, after the existence of the right to access the application APP and the absence of a user account CU is determined, the identity provider 2 triggers provisioning of the user account CU. In a first embodiment, the identity provider 2 performs itself provisioning by using the interfaces and protocols 6 available from the service provider 1 and by providing all the information necessary to the account creation. In a second embodiment, the identity provider 2 does not perform itself provisioning, but delegates it to the external component 9, for example a component for managing identities and accesses, which triggers provisioning instructions. The external component 9 uses the interfaces and the protocols 6 available from the service provider 1 and it provides all the information necessary to the creation of the user account CU.

According to a tenth step 30, after the user USR is properly authenticated by the identity provider 2, the right to access the application APP is determined by the user USR, and the provisioning mechanism resulting in the creation of a user account CU is achieved in the application service provider 1, the identity provider 2 generates a proof of authentication PAT associated with the user USR.

According to an eleventh step 31, the identity provider 2 sends the proof authentication PAT to the application service provider 1 in accordance with the protocol 5 between both parts.

According to twelfth step 32, the application service provider 1 uses the information provisioned in its database 4 and gives the user USR access to the application APP.

In a third case represented in FIG. 4, the user USR does not possess a proof of authentication PAT, does not have the right to access the application APP, and has a user account CU. This case occurs for example when the user USR had the right to access the application APP, has already been connected to the application APP, but then lost his/her rights to access the application APP.

According to a first step 41, the service provider 1 receives a request to access the application APP.

According to a second step 42, the service provider 1 determines whether the user USR possesses a proof of authentication PAT.

According to a third step 43, after it is determined that the user USR does not possess a proof of authentication PAT, the application service provider 1 determines which is the identity provider 2 associated with the user USR. The application service provider 1 uses the protocol mechanisms of federation or authentication delegation to determine the identity provider 2 of the user USR. In another embodiment, the application service provider 1 requests information to the user USR. In another embodiment, the application service provider 1 uses the specific naming of URLs of the service to determine the identity provider 2 associated therewith.

According to a fourth step 44, the service provider 1 redirects the user USR to the identity provider 2. According to the protocols of federation and identity delegation used, in another embodiment, the application service provider 1 directly sends a request to the identity provider 2. In both cases, regardless of whether the request comes from the user USR or the application service provider 1, the identity provider 2 receives a request for a proof of authentication PAT.

According to a fifth step 45, the identity provider 2 obtains from the local database 3 data about the user USR, including his/her authentication data DAT and his/her access rights data DAC.

According to a sixth step 46, the identity provider 2 authenticates the user USR by means of the authentication data DAT. For this, the identity provider 2 checks that the user USR is actually a declared user and that he/she has authentication means. Then, the authentication is performed, for example by means of a password, a certificate, a question-answer mechanism, etc.

According to a seventh step 47, if the user USR is properly authenticated, the application service provider 2 determines whether he/she possesses the right to access the application APP, by means of the access rights data DAC. The identity provider 2 thus checks that the user USR actually has the rights and roles necessary to be connected and use the application APP. It is noted that if the user USR fails to be properly authenticated, the process stops.

According to an eighth step 48, the identity provider 2 determines the existence or absence of a user account CU associated with the user USR, by querying the external database 4 managed by the application service provider 1. The identity provider 2 thus determines whether the user USR is already associated with a user account CU in the application service provider 1. For this, the identity provider 2 uses the interfaces and protocols 6 available from the application service provider 1.

According to a ninth step 49, after the absence of the right to access the application APP but the existence of a user account CU are determined, the identity provider 2 triggers deprovisioning of the user account CU. In a first embodiment, the identity provider 2 performs itself deprovisioning by using the interfaces and protocols 6 available from the service provider 1 and by providing all the information necessary to the destruction of the user account CU. In a second embodiment, the identity provider 2 does not perform itself deprovisioning, but delegates it to the external component 9, which triggers deprovisioning instructions. The external component 9 uses the interfaces and the protocols 6 available from the service provider 1 and it provides all the information necessary to the destruction of the user account CU. The user USR thereby will not have access to the application APP.

On the other hand, the identity provider 2 permanently saves the state of user accounts CU provisioned and deprovisioned for each user USR and each application service provider 1 (indeed, an identity provider 2 can be in relationship with several application service providers 1). Thus, in a step 50, following a provisioning (step 29) or a deprovisioning (step 49), the identity provider 2 updates information of user accounts, indicating the user accounts CU associated with the application service provider 1 and the user accounts CU associated with the user USR.

In a step 51, the identity provider 2 performs an overall checking step. During this overall checking step, for each user USR registered with the identity provider 2, the identity provider 2 obtains from the local database 3 access rights data relating to the user USR. Then, the identity provider 2 determines a list of user accounts CU to be deprovisioned, based on access rights and information of user accounts CU. Finally, the identity provider 2 triggers deprovisioning of the user accounts CU from the list of accounts to be deprovisioned in the manner described in step 49. This overall checking step 51 can be performed on demand or automatically upon changing the access rights data DAC. Thus, the identity provider 2 ensures that the user accounts CU provisioned are actually associated with users USR who still have the rights or roles necessary to use these user accounts CU. If so, user accounts CU are deprovisioned.

In a step 52, the identity provider 2 performs a reconciliation step. During this reconciliation step, the identity provider 2 obtains from the external database 4 a list of user accounts CU provisioned. Then, the identity provider 2 compares the information of the user accounts CU with the list of accounts to be provisioned. Finally, the identity provider 2 updates the information of user accounts based on the comparison result. This reconciliation step 52 can be made on demand or automatically at regular intervals. The identity provider 2 then obtains from the application service provider 1 the list of accounts of the enterprise and performs a matching with the list of the accounts known to the identity provider 2. This mechanism enables desynchronizations to be detected and possibly alerts to be generated, or even incoherencies to be corrected when detected.

In a step 53, the identity provider 2 performs an account deletion step. During this account deletion step 53, the identity provider 2 obtains a piece of information for modifying access rights data of a user USR. Then, the identity provider 2 determines a list of accounts to be deprovisioned, comprising at least one account associated with the user. The list is determined based on the access rights data modified and information about the accounts of the user. Finally, the identity provider 2 triggers deprovisioning of the user accounts CU from the list of accounts to be deprovisioned. Thus, in the case where a user USR loses his/her rights or roles necessary to the possession of a user account CU, then a deprovisioning can be triggered by using the account deletion mechanism.

Thus, the method according to the invention offers the advantage of creating the accounts only when they are actually used, of destructing the accounts which are no longer usable, and consequently of saving resources in terms of accounts declared in the application service provider.

The invention claimed is:

1. A method for managing user accounts in an application of an application service provider, comprising the following steps, performed by an identity provider sharing a trust relationship with the application service provider:
  receiving a request for proof of authentication in order to authenticate a user attempting to access the application, said user being registered with the identity provider;
  obtaining, from a local database, data about the user, said data comprising authentication data and access rights data;
  authenticating the user by means of the authentication data;
  determining the right to access the application by the user by means of the access rights data;
  determining an existence or absence of a user account associated with the user, by querying an external database managed by the application service provider;
  when the user has the right to access the application and there is no user account associated with the user:
    triggering provisioning of the user account at an entity;
    generating a proof of authentication associated with the user;
    sending said proof of authentication to the application service provider.

2. The method according to claim 1, comprising: when the user does not have the right to access the application and there is a user account associated with the user, triggering deprovisioning of the user account at the entity.

3. The method according to claim 1, wherein the entity is the application service provider, the identity provider providing account provisioning or deprovisioning instructions to the external database.

4. The method according to claim 1, wherein the entity is an external management component, the external management component providing account provisioning or deprovisioning instructions to the external database.

5. The method according to claim 1, wherein after provisioning or deprovisioning triggering of a user account, the identity provider updates information of user accounts, indicating the user accounts associated with the application service provider and the user accounts associated with the user.

6. The method according to claim 5, wherein the identity provider performs an overall checking step, comprising:
  for each user registered with the identity provider, obtaining form the local database access rights data relating to the user;
  determining a list of user accounts to be deprovisioned, based on the access rights and the information of user accounts;
  triggering the deprovisioning of the user accounts from the list of accounts to be deprovisioned.

7. The method according to claim 5, wherein the identity provider performs a reconciliation step, comprising:
  obtaining from the external database a list of user accounts provisioned;
  comparing the information of user accounts with the list of accounts to be provisioned;
  updating the information of user accounts based on the result of the comparison.

8. The method according to claim 5, wherein the identity provider performs an account deletion step, comprising:
  obtaining a piece of information for modifying access rights data of a user;
  determining a list of user accounts to be deprovisioned, based on the access rights data modified and the information of user accounts;
  triggering the deprovisioning of the user accounts from the list of accounts to be deprovisioned.

9. A non-transitory computer readable medium, comprising a set of instructions, which when run by a computer, causes the implementation of a method for managing user accounts in an application of an application service provider, comprising the following steps, performed by an identity provider sharing a trust relationship with the application service provider:
  receiving a request for proof of authentication in order to authenticate a user attempting to access the application, said user being registered with the identity provider;
  obtaining, from a local database, data about the user, said data comprising authentication data and access rights data;
  authenticating the user by means of the authentication data;
  determining the right to access the application by the user by means of the access rights data;
  determining an existence or absence of a user account associated with the user, by querying an external database managed by the application service provider;
  when the user has the right to access the application and there is no user account associated with the user:
    triggering provisioning of the user account at an entity;
    generating a proof of authentication associated with the user;
    sending said proof of authentication to the application service provider.

* * * * *